United States Patent
Ben-Moshe et al.

(10) Patent No.: US 12,169,703 B2
(45) Date of Patent: Dec. 17, 2024

(54) GRAPHICS PIPELINE OPTIMIZATIONS

(71) Applicant: Advanced Micro Devices, Inc., Santa Clara, CA (US)

(72) Inventors: Amit Ben-Moshe, Boxborough, MA (US); Brian Kenneth Bennett, Boxborough, MA (US); Qun Lin, Shanghai (CN); David Ronald Oldcorn, Milton Keynes (GB)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/205,993

(22) Filed: Mar. 18, 2021

(65) Prior Publication Data

US 2021/0294579 A1  Sep. 23, 2021

Related U.S. Application Data

(60) Provisional application No. 62/992,067, filed on Mar. 19, 2020.

(51) Int. Cl.
  *G06F 8/34* (2018.01)
  *G06F 3/0482* (2013.01)
  (Continued)

(52) U.S. Cl.
  CPC .............. *G06F 8/34* (2013.01); *G06F 3/0482* (2013.01); *G06F 3/04845* (2013.01); *G06F 8/41* (2013.01); *G06T 1/20* (2013.01)

(58) Field of Classification Search
  CPC .......... G06G 8/34; G06G 8/41; G06F 3/0482; G06F 3/04845; G06T 1/20
  See application file for complete search history.

(56) References Cited

U.S. PATENT DOCUMENTS 8,566,647 B2   10/2013   Maybee et al.
9,535,815 B2    1/2017   Smith et al.
(Continued)

OTHER PUBLICATIONS

John D. Owens et al., "GPU Computing", [Online], pp. 879-899, [Retrieved from Interent on Jul. 30, 2022], <https://ieeexplore.ieee.org/stamp/stamp.jsp?arnumber=4490127> (Year: 2008).*

(Continued)

*Primary Examiner* — Ziaul A Chowdhury
(74) *Attorney, Agent, or Firm* — Kowert, Hood, Munyon, Rankin & Goetzel, P.C.; Rory D. Rankin

(57) ABSTRACT

Systems, apparatuses, and methods for implementing graphics pipeline optimizations are disclosed. A user interface (UI) is generated to allow a user to analyze shaders and determine resource utilization on any of multiple different target graphic devices. The UI allows the user to manipulate the state associated with the target graphics device for a given graphics pipeline. After being edited by the user, the state of the graphics pipeline is converted into a textual representation and input into a meta-app. The meta-app creates an application programming interface (API) construct from the shader source code and textual representation of the state which is compiled by a driver component into machine-level instructions. Also, resource usage statistics are generated for a simulated run of the graphics pipeline on the target graphics device. Then, the machine-level instructions and resource usage statistics are displayed in the UI for the user to analyze.

20 Claims, 12 Drawing Sheets

(51) Int. Cl.
*G06F 3/04845* (2022.01)
*G06F 8/41* (2018.01)
*G06T 1/20* (2006.01)

(56) References Cited

U.S. PATENT DOCUMENTS

| | | | |
|---|---|---|---|
| 10,679,317 | B2 | 6/2020 | Kinross et al. |
| 10,909,653 | B2 | 2/2021 | Appu et al. |
| 10,929,947 | B2 | 2/2021 | Ray et al. |
| 10,930,060 | B2 | 2/2021 | Surti et al. |
| 2003/0179220 | A1* | 9/2003 | Dietrich, Jr. ............ G06T 15/80 345/679 |
| 2009/0231332 | A1* | 9/2009 | Woo ........................ G06T 15/80 345/506 |
| 2010/0122191 | A1* | 5/2010 | Aldinger ................. G06T 19/20 715/765 |
| 2015/0348224 | A1* | 12/2015 | Avkarogullari ........... G06F 8/47 345/506 |
| 2015/0355996 | A1* | 12/2015 | Smith ..................... G06F 9/461 717/128 |
| 2017/0003972 | A1* | 1/2017 | Elliott ................... G06F 9/3851 |
| 2020/0356610 | A1* | 11/2020 | Coimbra ................. H04L 63/10 |

OTHER PUBLICATIONS

Zarko Mljailovic et al. "Empirical Analysis of GUI Programming Concerns", [Online], pp. 757-771, [Retrieved from Interent on Jul. 17, 2024], <https://pdf.sciencedirectassets.com/272548/1-s2.0-S1071581914X00078/1-s2.0-S1071581914000664/main.pdf> (Year: 2014).*

* cited by examiner

GRAPHICS PIPELINE OPTIMIZATIONS

CROSS REFERENCE TO RELATED APPLICATIONS

This application claims priority to the U.S. Provisional Patent Application Ser. No. 62/992,067, entitled "GPU Pipeline Optimization", filed Mar. 19, 2020, the entirety of which is incorporated herein by reference.

BACKGROUND

Description of the Related Art

A common three-dimensional (3D) graphics processing pipeline accepts commands from a host (e.g., central processing unit (CPU)) and processes the commands to generate pixels for display on a display device. Graphics processing pipelines include a number of stages that perform individual tasks, such as transforming vertex positions and attributes, calculating pixel colors, and so on. Improvements and advances are continually being made to graphics processing pipelines.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing graphics pipeline optimizations are disclosed herein. In one implementation, a user interface (UI) is generated to allow a user to compile shaders and state and determine resource utilization for the shaders on any of multiple different target graphic devices. The UI allows the user to manipulate the state associated with the target graphics device for a given graphics pipeline. After being edited by the user, the state of the graphics pipeline is converted into a textual representation format and provided as input into a meta-app. As used herein, the term "meta-app" is defined as a generic application that can create a graphics or compute pipeline based on instructions that are provided to the generic application. The graphics or compute pipeline created by the meta-app can be generated to be compatible with any of various graphics application programming interfaces (APIs). In one implementation, there is a separate meta-app for each different graphics API.

In one implementation, a given meta-app creates an API construct for a corresponding graphics API from the shader source code and textual representation of the state, and the API construct is compiled by a driver component into machine-level instructions. In one implementation, the textual representation of the state is a textual description file which provides the instructions for creating a valid API construct. Also, resource usage statistics are generated for a simulated execution of the graphics pipeline on the target graphics device using the machine-level instructions created by the driver component. It is noted that the execution of the graphics pipeline can be simulated on any target graphics device, even those graphic devices which are not physically installed on the machine. Then, the machine-level instructions and resource usage statistics are displayed in the UI for the user to analyze. The user can edit the state and then recompile the graphics pipeline and generate a new set of machine-level instructions and resource usage statistics. This iterative process can be repeated any number of times.

Figure 1:
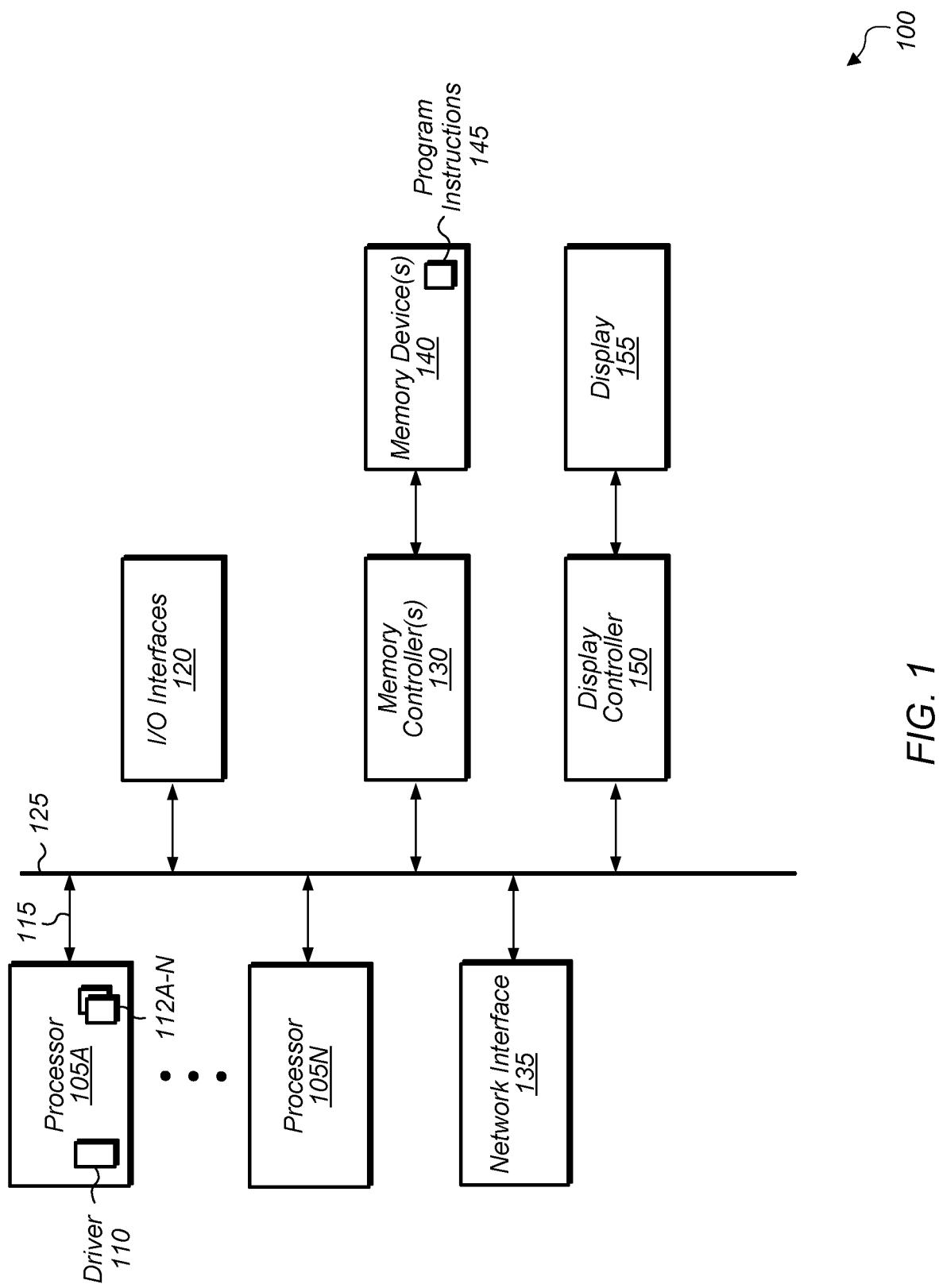
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU), with any number of execution units 112A-N (i.e., processor cores) for executing program instructions. Processor 105A is coupled to bus 125 via interface 115. Processor 105A receives, via interface 115, various data and instructions, such as shader programs, a pipeline state specification, program instructions 145, and/or other data and instructions. In one implementation, processor 105A creates an application programming interface (API) construct based on one or more shader programs and the pipeline state specification. In one implementation, processor 105A compiles the API construct to create machine-level instructions for generating pixels to be displayed. More details describing how processor 105A creates and compiles the API construct are provided throughout the remainder of this disclosure.

In one implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture, such as a graphics processing unit (GPU) which renders pixels for display controller 150 to drive to display 155.

A GPU is a complex integrated circuit that performs graphics-processing tasks. For example, a GPU executes graphics-processing tasks required by an end-user application, such as a video-game application. GPUs are also increasingly being used to perform other tasks which are unrelated to graphics. The GPU can be a discrete device or can be included in the same device as another processor, such as a CPU. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for a meta-app, a second set of program instructions for a driver component, and so on. Alternatively, program instructions 145 can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
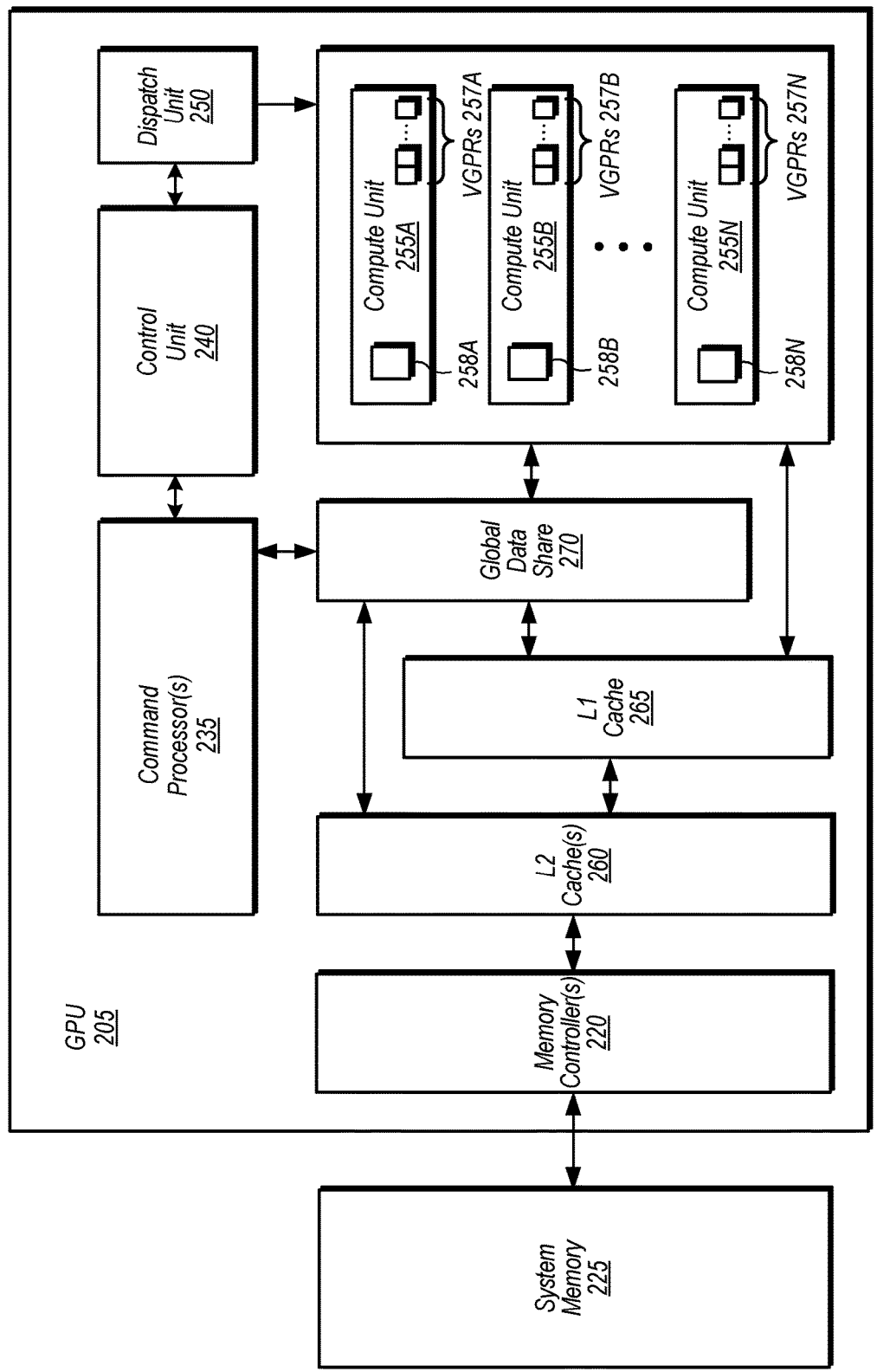
FIG. 2 is a block diagram of another implementation of a computing system.

Turning now to FIG. 2, a block diagram of another implementation of a computing system 200 is shown. In one implementation, system 200 includes at least GPU 205 and system memory 225. System 200 can also include other components which are not shown to avoid obscuring the figure. GPU 205 includes at least command processor(s) 235, control unit 240, dispatch unit 250, compute units 255A-N, memory controller(s) 220, global data share 270, level one (L1) cache 265, and level two (L2) cache(s) 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one implementation, command processor 235 receives kernels from the host CPU, and command processor 235 uses dispatch unit 250 to issue corresponding wavefronts to compute units 255A-N. In one implementation, a wavefront launched on a given compute unit 255A-N includes a plurality of work-items executing on the single-instruction, multiple-data (SIMD) units of the given compute unit 255A-N. Wavefronts executing on compute units 255A-N can access vector general purpose registers (VGPRs) 257A-N and a corresponding local data share (LDS) 258A-N located on compute units 255A-N. It is noted that VGPRs 257A-N are representative of any number of VGPRs.

Figure 3:
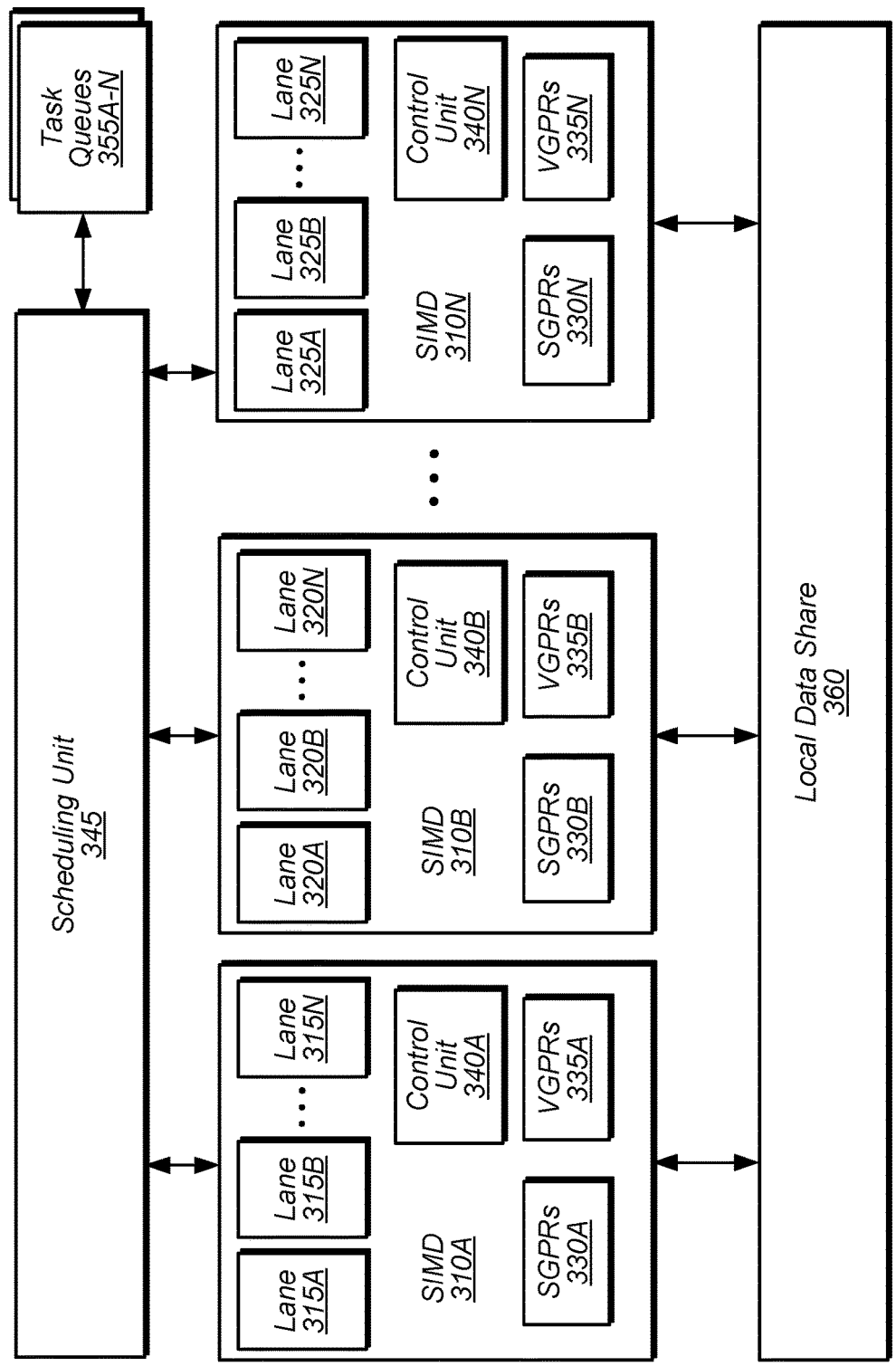
FIG. 3 is a block diagram of one implementation of a compute unit.

Referring now to FIG. 3, a block diagram of one implementation of a compute unit 300 is shown. In one implementation, compute unit 300 includes at least SIMDs 310A-N, scheduling unit 345, task queues 355A-N, and local data share (LDS) 360. It is noted that compute unit 300 can also include other components (e.g., texture load/store units, cache, texture filter units, branch and message unit, scalar unit, instruction buffer) which are not shown in FIG. 3 to avoid obscuring the figure. In one implementation, each of compute units 255A-N (of FIG. 2) includes the circuitry of compute unit 300.

When a data-parallel kernel is dispatched by the system to compute unit 300, corresponding tasks are enqueued in task queues 355A-N. Work-items (i.e., threads) of the kernel executing the same instructions are grouped into a fixed sized batch called a wavefront to execute on compute unit 300. Multiple wavefronts can execute concurrently on compute unit 300. The instructions of the threads of the wavefronts are stored in an instruction buffer (not shown) and scheduled for execution on SIMDs 310A-N by scheduling unit 345. When the wavefronts are scheduled for execution on SIMDs 310A-N, corresponding threads execute on the individual lanes 315A-N, 320A-N, and 325A-N in SIMDs 310A-N. Each lane 315A-N, 320A-N, and 325A-N of SIMDs 310A-N can also be referred to as an "execution unit" or an "execution lane".

In one implementation, compute unit 300 receives a plurality of instructions for a wavefront with a number N of threads, where N is a positive integer which varies from processor to processor. When threads execute on SIMDs 310A-N, the instructions executed by threads can include store and load operations to/from scalar general purpose registers (SGPRs) 330A-N, VGPRs 335A-N, and LDS 360. Control units 340A-N in SIMDs 310A-N are representative of any number of control units which can be located in any suitable location(s) within compute unit 300. Control units 340A-N can be implemented using any suitable combination of circuitry and/or program instructions.

Figure 4:
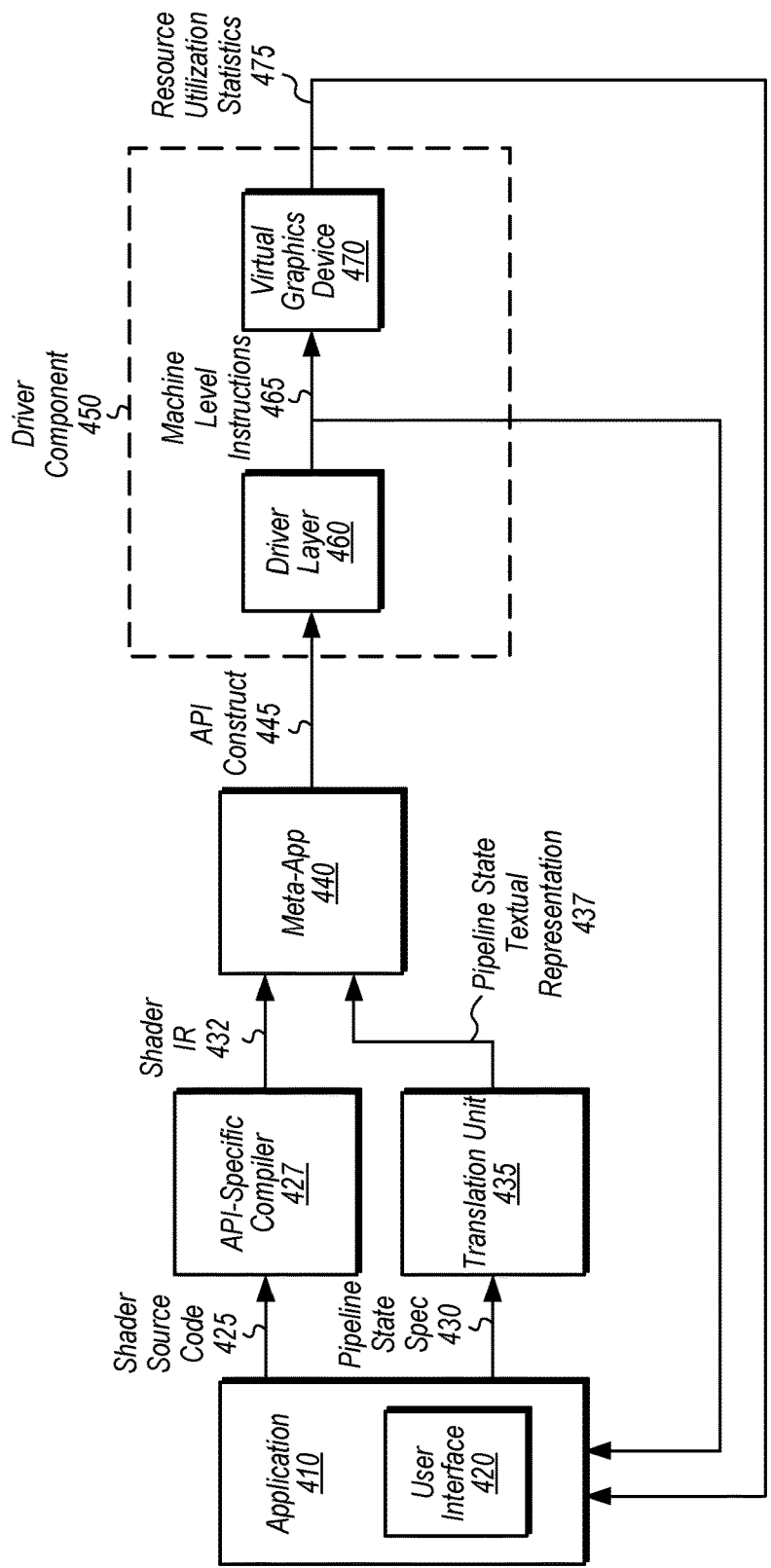
FIG. 4 is a logical block diagram of one implementation of a system for building a graphics pipeline.
Figure 5:
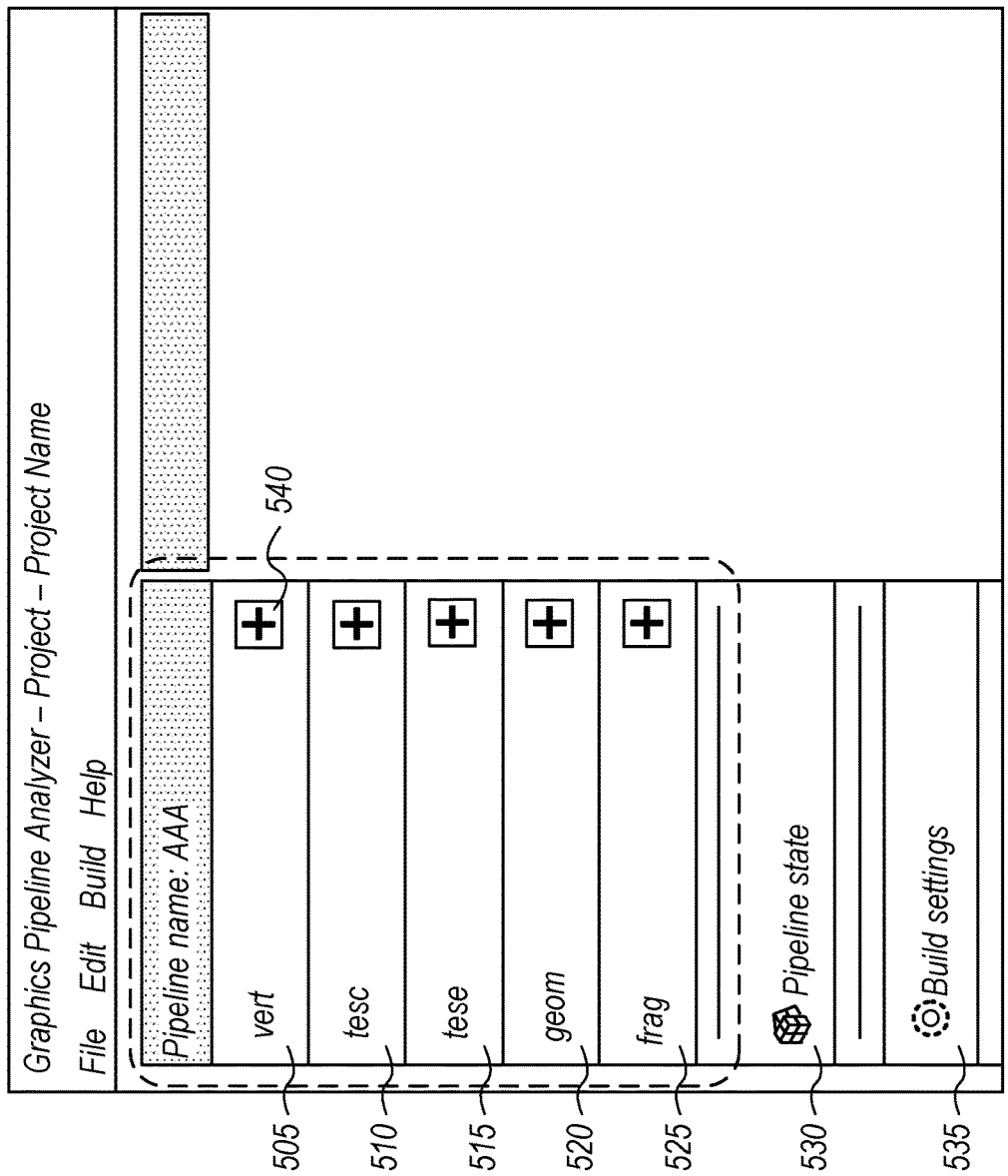
FIG. 5 is a portion of a user interface for building a graphics pipeline.
Figure 6:
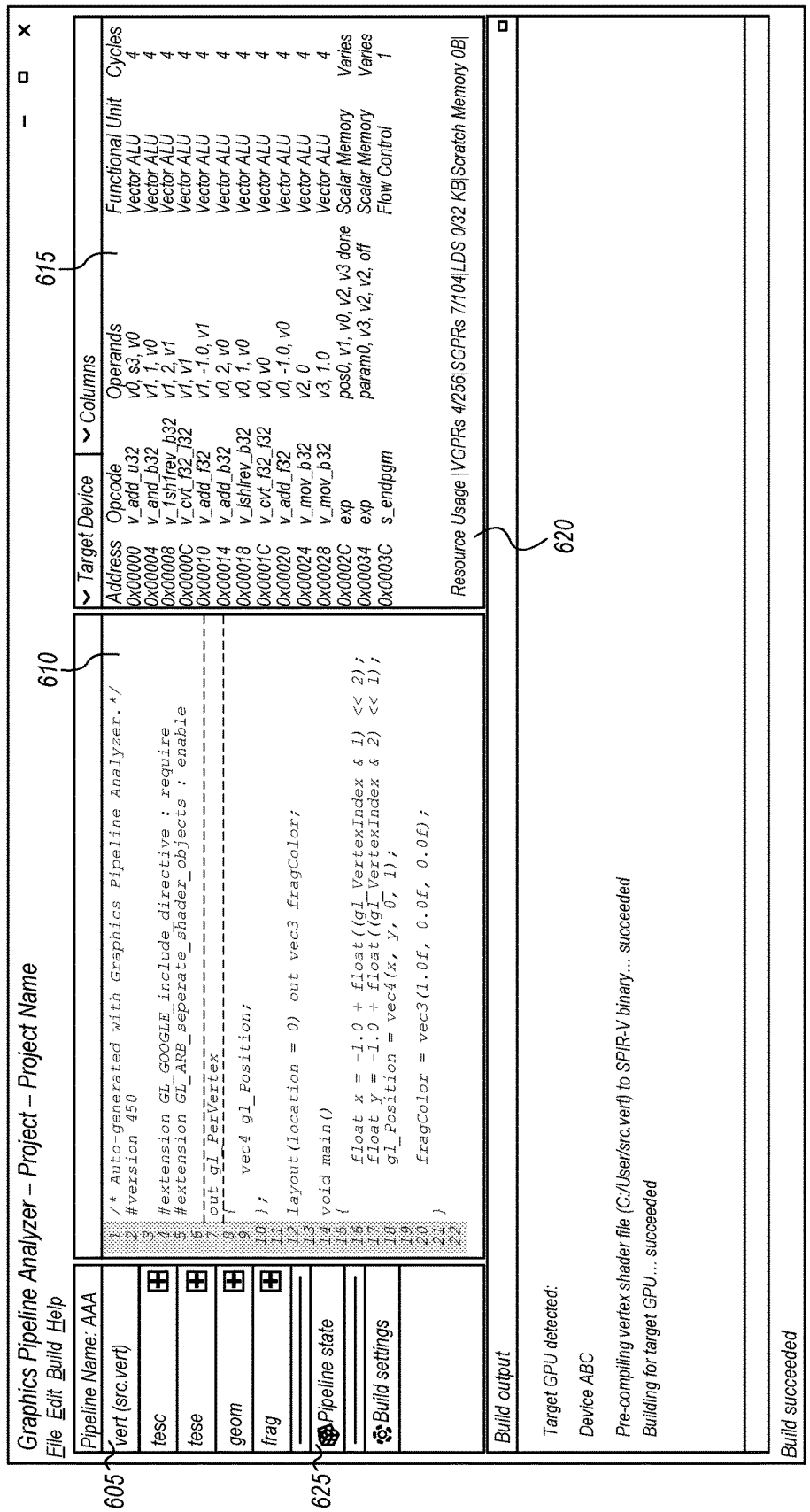
FIG. 6 is a user interface for editing a graphics pipeline.
Figure 7:
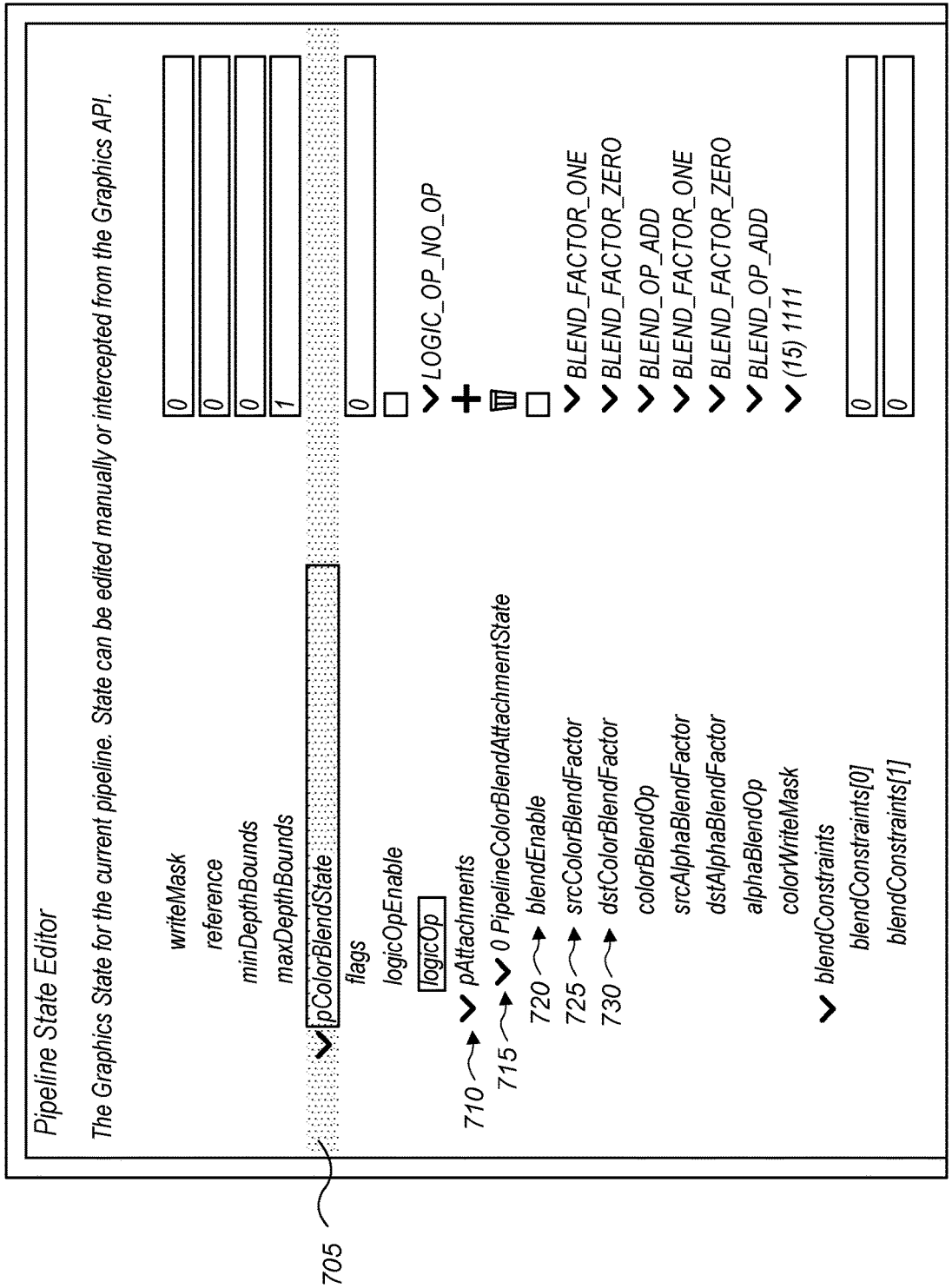
FIG. 7 is a user interface for editing a pipeline state.

Turning now to FIG. 4, a logical block diagram of one implementation of a system 400 for building a graphics pipeline is shown. While system 400 includes the logical components for building a graphics pipeline for one particular implementation, the physical components of system 400 can include any or the entirety of the components shown for system 100 (of FIG. 1). As shown in FIG. 4, system 400 includes application 410 which generates user interface 420 for receiving shader source code 425 and pipeline state specification (spec) 430 from a user. Examples of a user interface 420 are shown in FIGS. 5-7 and described in further detail below. Depending on the implementation, user interface 420 can be generated and displayed by a personal computer (PC), laptop, tablet, smartphone, or other type of computing system or device. User interface 420 allows the user to configure and define the pipeline state for the graphics pipeline being built. As used herein, the term "state" or "pipeline state" is defined as a set of configuration settings for the graphics pipeline that incorporates the corresponding shaders. For example, the set of configuration settings may include the target display type, resolution (e.g., 3840×2160 pixel resolution), pixel format, and so on.

In one implementation, shader source code 425 is compiled by API-specific compiler 427 into a shader intermediate representation (IR) 432 which is provided to meta-app 440. In one implementation, meta-app 440 is a generic software application executing on a computing device or computing system. In one implementation, meta-app 440 executes on the same computing device or system that generates and displays user interface 420. In another implementation, meta-app 440 executes on a different computing device or system from the device/system which generates and displays user interface 420. Additionally, depending on the implementation, meta-app 440 can be combined with application 410 or meta-app 440 can execute independently of application 410. Pipeline state spec 430 is provided to translation unit 435 which converts spec 430 into a pipeline state textual representation 437. In one implementation, pipeline state textual representation 437 is generated in a Javascript Object Notation (JSON) format. In one implementation, translation unit 435 is part of application 410. In another implementation, translation unit 435 is a separate component from application 410.

Pipeline state textual representation 437 is provided to meta-app 440. Meta-app 400 generates application programming interface (API) construct 445 from shader IR 432 and pipeline state textual representation 437. API construct 445 combines shader IR 432 and pipeline state textual representation 437 in a format that is compatible with a particular graphics pipeline API (e.g., Vulkan™, Metal, DirectX™ 12 (DX12)). API construct 445 is provided to driver component 450. As used herein, the term "API construct" is defined as a combination of one or more shader programs and a pipeline state specification, with the combination generated in a format which is compatible with a particular graphics pipeline API. In one implementation, the pipeline state specification is generated separately and independently from the shader programs prior to the pipeline state specification being combined with the shader programs to form the API construct.

In one implementation, driver component 450 includes driver layer 460 and virtual graphics device 470. Virtual graphics device 470 represents the target graphics device specified by the user. In one implementation, driver component 450 creates virtual graphics device 470 to simulate that the target graphics device is actually installed in system 400. Driver layer 460 generates machine level instructions 465 from API construct 445, and machine level instructions 465 are provided to virtual graphics device 470 in order to generate resource utilization statistics 475.

It is noted that virtual graphics device 470 allows resource utilization statistics 475 to be generated without requiring the specific target device to be installed as one of the physical components of system 400. This allows the user to target any potential graphics device and generate corresponding machine level instructions 465 and resource utilization statistics 475 which are specific to any potential graphics device. Machine level instructions 465 and resource utilization statistics 475 are presented to the user via user interface 420. Machine level instructions 465 and resource utilization statistics 475 can also be stored in a memory (not shown), sent over a network (not shown), executed by an actual graphics device, or processed in other manners.

It is noted that an iterative process can be used to make changes to shader source code 425 and/or pipeline state spec 430 to improve the results generated by system 400. For example, user 410 can interact with user interface 420 to incrementally update shader source code 425 and/or pipeline state spec 430. The user can view the resultant machine level instructions 465 and resource utilization statistics 475 in user interface 420 and decide to make one or more changes to shader source code 425 and/or pipeline state spec 430. Then, system 400 generates a new set of machine level instructions 465 and resource utilization statistics 475 based on the change(s). The user can view and analyze the new set of machine level instructions 465 and resource utilization statistics 475 and decide whether more changes are warranted. This process can continue through any number of iterations.

Referring now to FIG. 5, a portion of a user interface (UI) 500 for building a graphics pipeline in accordance with one implementation is shown. UI 500 illustrates a portion of the overall user interface that is generated and displayed to a user in one particular implementation. In one implementation, there are five slots in UI for specifying shader source code files corresponding to five shader stages. For example, slot 505 is for a vertex shader, slot 510 is for a tessellation control shader, slot 515 is for a tessellation evaluation shader, slot 520 is for a geometry shader, and slot 525 is for a fragment shader. To link source code for a given stage of the pipeline, the user clicks the "+" button in the corresponding slot of UI 500, with the "+" button 540 labeled for vertex shader slot 505.

Also, UI 500 includes pipeline state button 530 which allows the user to specify the state of the graphics pipeline. In one implementation, when the user clicks on pipeline state button 530, an editor is opened which allows the user to edit the state of the graphics pipeline. When the user is finishing editing the state, the user saves the state, which causes a textual representation of the state to be generated. Additionally, UI 500 includes build settings button 535 for specifying various build settings to be used when building the corresponding graphics pipeline. It is noted that in other implementations, UI 500 can include other graphical elements and/or be organized differently than is shown in FIG. 5.

Turning now to FIG. 6, a graphics pipeline user interface (UI) 600 for editing a graphics pipeline in accordance with one implementation is shown. UI 600 illustrates one example of a UI for enabling a user to edit a graphics pipeline. In one implementation, UI 600 includes five slots on the left-side of the UI for corresponding shaders. Vertex shader slot 605 is the only slot populated in the example shown in UI 600. In one implementation, the other slots correspond to a tessellation control shader, a tessellation evaluation shader, a geometry shader, and a fragment shader. Section 610 to the right of the slots includes the shader source code for the vertex shader. The user can provide their own source code file and link the source code for each pipeline stage by clicking the "+" button in any of the shader slots. Alternatively, a blank or template source file can be generated for any of the shader slots rather than linking to an existing source code file.

After the shader source code is compiled, the machine-level instructions are generated and displayed in section 615. Section 615 provides a direct correlation back to the source code in section 610 to allow the user to identify how the source code file instructions are translated into machine-level instructions. Also, resource usage section 620 includes an identification of the resources that will be utilized in the target graphics device by the graphics pipeline as built. As shown in resource usage section 620, 4 out of 256 vector general purpose registers (VGPRs) are being used, 7 out of 104 scalar general purpose registers (SGPRs) are being used, 0 kilobytes (KB) out of 32 KB of local data share (LDS) are occupied, and 0 bytes (B) of scratch memory are being used by the graphics pipeline.

It is noted that resource usage section 620 is merely intended to serve as one example of the types of resources being tracked. In other implementations, the usage of other types of resources can be tracked by resource usage section 620. UI 600 also includes pipeline state button 625 for specifying the state associated with the graphics pipeline. The state can also be edited when the user selects pipeline state button 625. One example of a UI for editing the pipeline state is shown in FIG. 7 and described in more detail below.

Referring now to FIG. 7, a graphics pipeline user interface (UI) 700 for editing a pipeline state in accordance with one implementation is shown. In one implementation, UI 700 allows the user to edit the pipeline state, with the pipeline state represented in a tree-like structure. A portion of the total pipeline state is shown in UI 700, with rows for the various state settings shown in FIG. 7. It should be understood that the pipeline state can have any number of additional rows which are not shown to avoid cluttering the figure. As shown in FIG. 7, the "pColorBlendState" row 705 is shaded to indicate that it has been selected by the user, with "pColorBlendState" referring to the pipeline color blend state. The various settings within the pipeline color blend state are presented in a hierarchical tree structure below "pColorBlendState" row 705.

For example, "pAttachments" component 710 is below the highlighted "pColorBlendState" row 705. The "pAttachments" component 710 refers to pipeline attachments, with "Pipeline ColorBlendAttachementState" component 715 a child component of the "pAttachments" component 710. The various components underneath the "Pipeline ColorBlendAttachmentState" component 715 include "blendEnable" component 720, "srcColorBlendFactor" component 725 for adjusting the source color blend factor, "dstColorBlendFactor" component 730 for adjusting the destination color blend factor, and so on.

The other portions of the pipeline state that can be displayed in UI 700 by scrolling up or down include various state variables. Examples of state variables include, but are not limited to, the following: compare operation, border color, texel buffer type, sample count flag bits, attachment load operation, attachment store operation, image layout, pipeline bind point, access flag bits, dependency flag bits, vertex input rate, primitive topology, polygon mode, cull mode flag bits, front fact rotation, stencil operation, logic operation, blend factor, blend operation, dynamic state, filter, sampler mip-map mode, sampler address mode, and pixel format. In other implementations, the state variables can include other variables and/or omit or more of the above variables.

Figure 8:
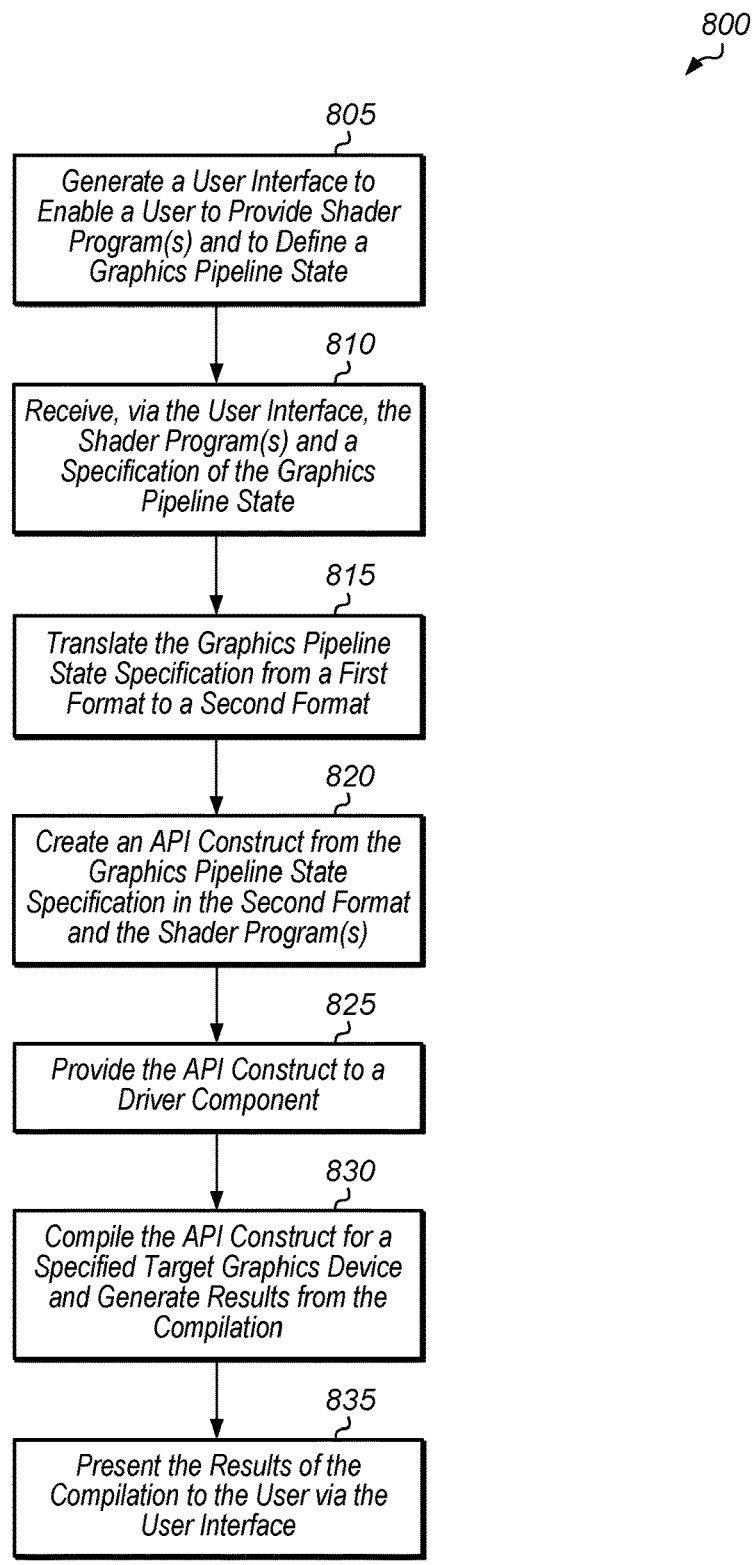
FIG. 8 is a generalized flow diagram illustrating one implementation of a method for building a graphics pipeline and generating compilation results.
Figure 9:
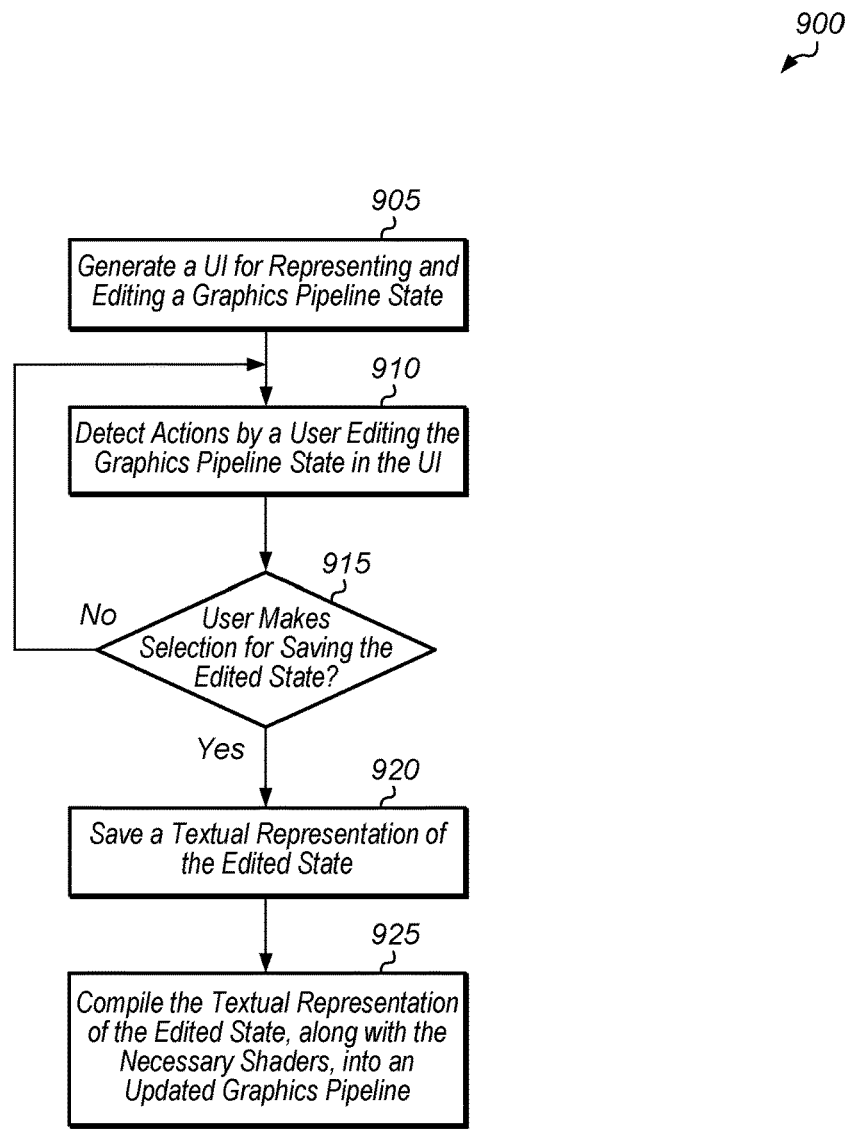
FIG. 9 is a generalized flow diagram illustrating one implementation of a method for generating a user interface to allow a user to edit a graphics pipeline state.
Figure 10:
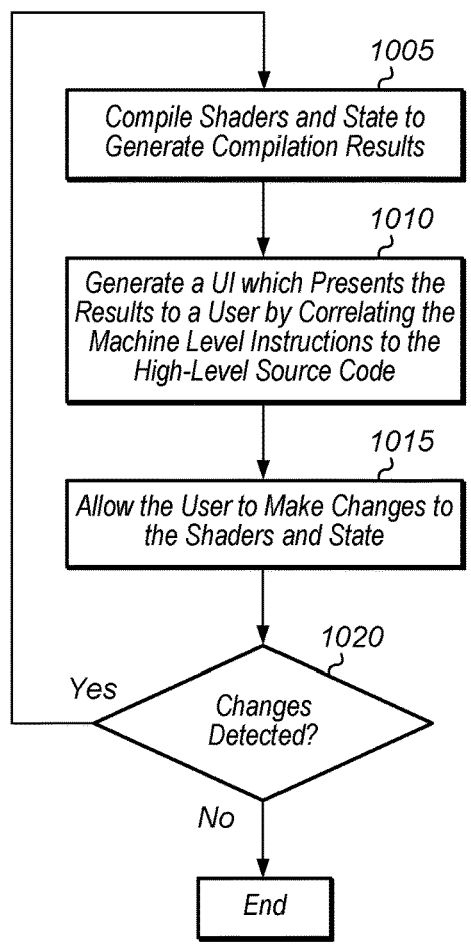
FIG. 10 is a generalized flow diagram illustrating one implementation of a method for correlating machine-level instructions to shader source code.
Figure 11:
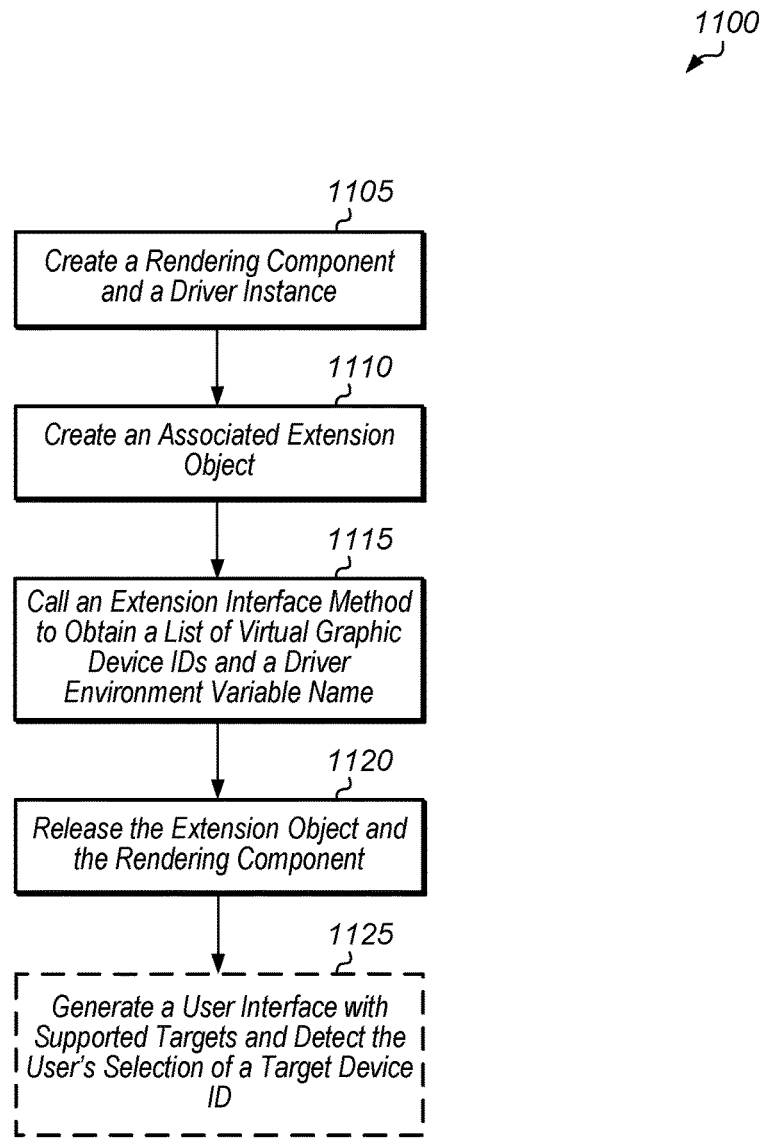
FIG. 11 is a generalized flow diagram illustrating one implementation of a method for an application to obtain a list of virtual graphics device IDs.

Turning now to FIG. 8, one implementation of a method 800 for building a graphics pipeline and generating compilation results is shown. For purposes of discussion, the steps in this implementation and those of FIG. 9-11 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 800 (and methods 900-1100).

An application (e.g., application 410 of FIG. 4) generates a user interface to enable a user to provide one or more shader programs (i.e., shader source code) and to define a graphics pipeline state (block 805). The application receives, via the user interface, the shader program(s) and a specification of the graphics pipeline state (block 810). Next, the application translates the graphics pipeline state specification from a first format to a second format different from the first format (block 815). The first format corresponds to the representation of the state within the user interface. In one implementation, the second format is a textual representation in a JSON format. In other implementations, the second format can be any of various other suitable formats.

Then, the application (e.g., meta-app 440) creates an API construct from the graphics pipeline state specification in the second format and the shader program(s) (block 820). Next, the application provides the API construct to a driver component (e.g., driver component 450) (block 825). Then, the driver component compiles the API construct for a specified target graphics device and generates results from the compilation (block 830). In one embodiment, the results include machine-level instructions and resource utilization statistics. The driver component can generate results for any of various types of graphics devices (e.g., GPUs) even if the actual physical device is not installed in the system. The results of the compilation are then presented to the user via the user interface (block 835). After block 835, method 800 ends. The user can then modify the shader program(s) and state using the user interface in response to reviewing the compilation results.

Referring now to FIG. 9, one implementation of a method 900 for generating a user interface (UI) to allow a user to edit a graphics pipeline state is shown. A computing system (e.g., system 400 of FIG. 4) generates a UI for representing and editing a graphics pipeline state (block 905). In one implementation, the graphics pipeline state is based on a particular graphics API (e.g., Vulkan™). In one implementation, the relationships between the components of the graphics pipeline state are presented in the UI.

The system detects actions by a user for editing the state in the UI (block 910). If the user makes a selection in the UI for saving the edited state (conditional block 915, "yes" leg), then the system saves a textual representation of the edited state (block 920). In one implementation, the textual representation is stored in a JSON format. In other implementations, other formats can be used for the textual representation. Next, the textual representation of the edited state, along with the necessary shaders, are compiled into an updated graphics pipeline (block 925). After block 925, method 900 ends. After block 925, the user can analyze and/or perform other actions with the updated graphics pipeline.

Turning now to FIG. 10, one implementation of a method 1000 for correlating machine-level instructions to shader source code is shown. A system (e.g., system 400 of FIG. 4) compiles shaders and state to generate compilation results (block 1005). The system generates a UI which presents the results by correlating the machine level instructions to the high-level source code (block 1010). The UI allows the user to make changes to the shaders and state (block 1015). If changes are detected (conditional block 1020, "yes" leg), then method 1000 returns to block 1005 to recompile the shaders and state. Otherwise, if no changes are detected (conditional block 1020, "no" leg), then method 1000 ends.

Referring now to FIG. 11, one implementation of a method 1100 for an application to obtain a list of virtual graphics device IDs is shown. An application creates a rendering component (e.g., Direct 3D (D3D) Device) and a driver instance (block 1105). Next, the application creates an associated extension object (block 1110). Also, the application queries the driver to obtain a list of virtual graphics device IDs and a driver environment variable name (block 1115). Then, the application releases the extension object and the rendering component (block 1120). After block 1120, method 1100 ends. Optionally, after block 1120, the application generates a user interface for displaying supported targets and the application detects the user's selection of a target device ID (block 1125). In another implementation, the application selects a target device ID without interacting with the user.

Figure 12:
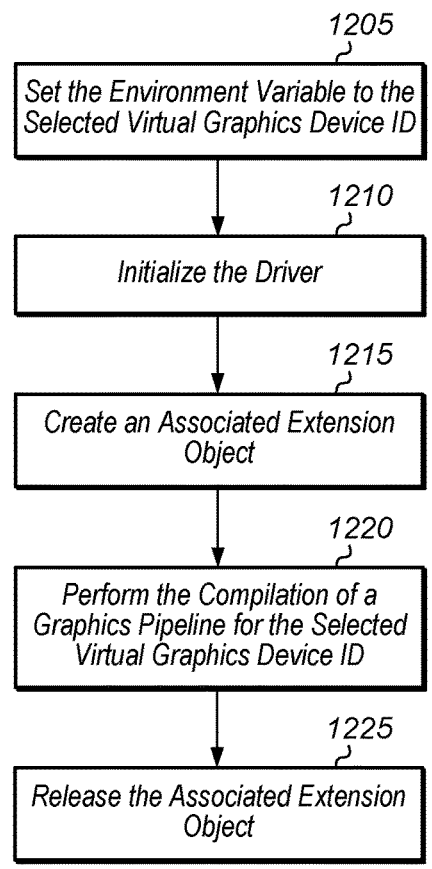
FIG. 12 is a generalized flow diagram illustrating one implementation of a method for an application to obtain shader statistics for a pipeline state.

Turning now to FIG. 12, one implementation of a method 1200 for an application to obtain shader statistics for a pipeline state is shown. In one implementation, method 1200 is performed after the application performs method 1100 (of FIG. 11) to obtain a list of virtual graphics device IDs. At the start of method 1200, the application sets the environment variable to the selected virtual graphics device ID (block 1205). In one implementation, the desired virtual graphics device ID is determined as a result of block 1115 of method 1100. Next, the application initializes the driver (block 1210). Then, the application creates an associated extension object (block 1215). Next, the application performs the compilation of a graphics pipeline for the selected virtual graphics device ID (block 1220). Then, the application releases the associated extension object (block 1225). After block 1225, method 1200 ends.

After method 1200 is performed, the driver is in virtual graphics device mode with functionality limited to creating pipeline states for shader analysis and for generating shader statistics. Shader statistics include a variety of parameter data, such as, but not limited to, vertex shader statistics, hull shader statistics, domain shader statistics, geometry shader statistics, hardware register availability and utilization, memory usage, shader core size, number of threads per thread group in the X dimension, number of threads per thread group in the Y dimension, number of threads per thread group in the Z dimension, and other parameters. For example, in one implementation, the hardware register statistics include one or more of the number of used vector general purpose registers (VGPRs), the number of used scalar general purpose registers (SGPRs), the number of VGPRs made available to the shader, and the number of SGPRs made available to the shader.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
receiving, by circuitry of a processor, one or more shader programs and a pipeline state;
creating an application programming interface (API) construct based on the one or more shader programs and the pipeline state that indicates configuration settings for the pipeline;
generating resource utilization statistics, based on a compiled version of the API construct; and
generating a graphical user interface (GUI) to display the resource utilization statistics and machine-level instructions corresponding to a graphics pipeline.

2. The method as recited in claim 1, wherein the pipeline state is in a first format different from a second format of the API construct.

3. The method as recited in claim 2, further comprising generating the GUI to display a correlation between the machine-level instructions and shader source code.

4. The method as recited in claim 1, further comprising creating a virtual graphics device for generating resource utilization statistics based on a compiled version of the API construct.

5. The method as recited in claim 2, further comprising generating the GUI to allow a user to edit the pipeline state.

6. The method as recited in claim 2, further comprising convert the pipeline state from the second format corresponding to a representation of the pipeline state within the user interface to the first format.

7. The method as recited in claim 6, further comprising creating the API construct by executing a generic application that receives instructions of the pipeline state in the first format and instructions of the one or more shader programs, and wherein the first format is a textual representation.

8. A processor comprising:
one or more execution circuits configured to:
receive, via an interface, one or more shader programs and a pipeline state;
create an application programming interface (API) construct based on the one or more shader programs and the pipeline state;
generate resource utilization statistics, based on a compiled version of the API construct; and
circuitry configured to generate a graphical user interface (GUI) to display the resource utilization statistics and machine-level instructions corresponding to a graphics pipeline.

9. The processor as recited in claim 8, wherein the pipeline state is in a first format different from a second format of the API construct.

10. The processor as recited in claim 9, wherein the GUI is configured to display a correlation between the machine-level instructions and shader source code.

11. The processor as recited in claim 8, wherein the processor is further configured to create a virtual graphics device for generating resource utilization statistics based on a compiled version of the API construct.

12. The processor as recited in claim 9, wherein the processor is further configured to generate the GUI to allow a user to edit the pipeline state.

13. The processor as recited in claim 9, wherein the processor is further configured to convert the pipeline state from a first format corresponding to a representation of the pipeline state within the user interface to the first format.

14. The processor as recited in claim 13, wherein the processor is further configured to create the API construct by executing a generic application that receives instructions of the pipeline state in the first format and instructions of the one or more shader programs, and wherein the first format is a textual representation.

15. A system comprising:
a memory storing first program instructions of a meta-app and second program instructions of a driver component; and
a processor comprising circuitry configured to:
receive, via an interface, one or more shader programs and a pipeline state;
execute the first program instructions to create an application programming interface (API) construct based on the one or more shader programs and the pipeline state;
generate resource utilization statistics, based on a compiled version of the API construct; and
generate a graphical user interface (GUI) to display the resource utilization statistics and machine-level instructions corresponding to a graphics pipeline.

16. The system as recited in claim 15, wherein the pipeline state is in a first format different from a second format of the API construct.

17. The system as recited in claim 16, wherein the processor is further configured to generate the GUI to display a correlation between the machine-level instructions and shader source code.

18. The system as recited in claim 15, wherein the processor is further configured to create a virtual graphics device for generating resource utilization statistics based on a compiled version of the API construct.

19. The system as recited in claim 17, wherein the processor is further configured to generate the GUI to allow a user to edit the pipeline state.

20. The system as recited in claim 16, wherein the processor is further configured to convert the pipeline state from the second format corresponding to a representation of the pipeline state within a user interface to the first format.

* * * * *